United States Patent
Ono

(10) Patent No.: US 7,949,153 B2
(45) Date of Patent: May 24, 2011

(54) IMAGE PROCESSING SYSTEM, IMAGE PROCESSING METHOD, IMAGE PROCESSING PROGRAM, IMAGE CAPTURING APPARATUS, AND IMAGE CAPTURING METHOD

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1456 days.

(21) Appl. No.: 11/391,660

(22) Filed: Mar. 29, 2006

(65) Prior Publication Data
US 2006/0232682 A1 Oct. 19, 2006

(30) Foreign Application Priority Data

Mar. 29, 2005 (JP) ................................. 2005-095902
Feb. 23, 2006 (JP) ................................. 2006-047324

(51) Int. Cl.
*G06K 9/00* (2006.01)
(52) U.S. Cl. .................................................. 382/106
(58) Field of Classification Search .................. 382/106, 382/303, 307, 255; 396/89
See application file for complete search history.

(56) References Cited

U.S. PATENT DOCUMENTS

| | | | | |
|---|---|---|---|---|
| 5,305,092 A * | 4/1994 | Mimura et al. | ............... | 356/609 |
| 5,606,630 A * | 2/1997 | Maeda et al. | ............... | 382/254 |
| 6,813,395 B1 * | 11/2004 | Kinjo | ............................ | 382/305 |
| 6,972,744 B1 * | 12/2005 | Allio | ............................... | 345/88 |
| 7,053,953 B2 * | 5/2006 | Belz et al. | ..................... | 348/346 |
| 7,212,668 B1 * | 5/2007 | Luo et al. | ...................... | 382/165 |
| 7,512,262 B2 * | 3/2009 | Criminisi et al. | ............. | 382/154 |
| 7,593,552 B2 * | 9/2009 | Higaki et al. | ................. | 382/118 |
| 7,715,589 B2 * | 5/2010 | Freeman et al. | .............. | 382/103 |
| 2003/0137597 A1 * | 7/2003 | Sakamoto et al. | ............ | 348/371 |
| 2004/0101296 A1 * | 5/2004 | Nakata et al. | .................. | 396/65 |

FOREIGN PATENT DOCUMENTS

JP 9-186935 A 7/1997
WO WO 0010332 A1 * 2/2000

* cited by examiner

*Primary Examiner* — Matthew C Bella
*Assistant Examiner* — Dennis Rosario
(74) *Attorney, Agent, or Firm* — Birch, Stewart, Kolasch & Birch, LLP

(57) ABSTRACT

An image processing is performed based on a distance computed for each partial area within an image capturing range. An image processing system according to the present invention includes a captured image acquiring section that acquires a captured image taken by an image capturing apparatus, a distance information acquiring section that acquires subject distance information that is information indicative of a distance between the image capturing apparatus and a subject for each of a plurality of partial areas in the captured image acquired by the captured image acquiring section, and an image processing section that performs an image processing different from one another on each of the plurality of partial areas in the captured image acquired by the captured image acquiring section according to the subject distance information acquired by the distance information acquiring section.

9 Claims, 12 Drawing Sheets

IMAGE PROCESSING SYSTEM, IMAGE PROCESSING METHOD, IMAGE PROCESSING PROGRAM, IMAGE CAPTURING APPARATUS, AND IMAGE CAPTURING METHOD

CROSS REFERENCE TO THE RELATED APPLICATION

This patent application claims priority from Japanese Patent Applications Nos. JP 2005-095902 filed on Mar. 29, 2005 and 2006-047324 filed on Feb. 23, 2006, the contents of which are incorporated herein by reference.

BACKGROUND OF THE INVENTION

1. Field of the Invention

The present invention relates to an image processing system, an image processing method, an image processing program, an image capturing apparatus, and an image capturing method. More particularly, the present invention relates to an image processing system including an image processing apparatus, an image processing method, an image processing program, an image capturing apparatus, and an image capturing method.

2. Description of Related Art

Conventionally, a method for averaging difference data between captured images taken at a plurality of focusing distances to trim the images has been proposed as disclosed, for example, in Japanese Patent Application Publication No. 1997-186931. Moreover, a method for setting an initial outline by comparing a focused image focused on a subject and an unfocused image not focused to trim the subject by removing a background image from the initial outline has been proposed as disclosed, for example, in Japanese Patent Application Publication No. 1997-186935.

However, in the inventions described in Japanese Patent Application Publication No. 1997-186931 and Japanese Patent Application Publication No. 1997-186935, since a boundary of a subject cannot be definitely determined, it may be difficult to definitely separate the boundary of the subject from a background image. Therefore, there has been a problem in that it is difficult to trim a subject with high precision.

SUMMARY OF THE INVENTION

Therefore, it is an object of the present invention to provide an image processing system, an image processing method, an image processing program, an image capturing apparatus, and an image capturing method that can solve the foregoing problems. The above and other objects can be achieved by combinations described in the independent claims. The dependent claims define further advantageous and exemplary combinations of the present invention.

According to the first aspect of the present invention, there is provided an image processing system including an image processing apparatus. The image processing system includes: a captured image acquiring section that acquires a captured image taken by an image capturing apparatus; a distance information acquiring section that acquires subject distance information that is information indicative of a distance between the image capturing apparatus and a subject for each of a plurality of partial areas in the captured image acquired by the captured image acquiring section; and an image processing section that performs an image processing different from one another on each of the plurality of partial areas in the captured image acquired by the captured image acquiring section according to the subject distance information acquired by the distance information acquiring section.

Moreover, the image processing system may further include a boundary specifying section that specifies a boundary of a subject in the captured image acquired by the captured image acquiring section based on the subject distance information acquired by the distance information acquiring section, and the image processing section may use the boundary specified by the boundary specifying section to perform an image processing on the captured image acquired by the captured image acquiring section. Moreover, the image processing section may use the boundary specified by the boundary specifying section to trim off the captured image acquired by the captured image acquiring section. Moreover, the image processing system may further include a main subject area specifying section that specifies a main subject area that is an area of a main subject included in the captured image acquired by the captured image acquiring section by means of the boundary specified by the boundary specifying section, and the image processing section may perform an image processing different from each other on an image in the main subject area and an image in an area except the main subject area.

Furthermore, the image processing section may perform an image processing on the image in the area except the main subject area so as to have a color definition lower than that of the image in the main subject area, and the image processing section may perform an image processing by a gamma correction on the image in the area except the main subject area so as to have a color definition lower than that of the image in the main subject area. Moreover, the image processing section may perform an image processing on an image in the partial area farther from the image capturing apparatus using the subject distance information acquired by the distance information acquiring section so as to have a lower color definition.

Moreover, the distance information acquiring section may include: a preliminary image acquiring section that acquires a plurality of preliminary images taken by an image capturing section every focusing distance when a focusing distance controlling section included in the image capturing apparatus sequentially changes a focusing distance of the image capturing section; and a subject distance computing section that analyzes the plurality of preliminary images acquired by the preliminary image acquiring section every focusing distance to compute a distance between the image capturing apparatus and the subject for each of the plurality of partial areas in the captured image acquired by the captured image acquiring section.

Furthermore, the subject distance computing section may include: a spatial frequency computing section that computes a spatial frequency distribution every partial area for each of the plurality of preliminary images acquired by the preliminary image acquiring section every focusing distance; and a subject distance determining section that compares the spatial frequency distributions computed from the spatial frequency computing section in regard to the same partial area of the preliminary images different from one another and determines a focusing distance of the preliminary image having the largest level of spatial frequency component in a predetermined partial area as a distance between the image capturing apparatus and the subject in the predetermined partial area. Moreover, the distance information acquiring section may have a measured distance data acquiring section that acquires measured distance data indicative of a distance between the image capturing apparatus and the subject measured by a distance measuring section included in the image capturing apparatus as the subject distance information.

According to the second aspect of the present invention, there is provided an image processing method. The method includes: a captured image acquiring step of acquiring a captured image taken by an image capturing apparatus; a distance information acquiring step of acquiring subject distance information that is information indicative of a distance between the image capturing apparatus and a subject for each of a plurality of partial areas in the captured image acquired in the captured image acquiring step; and an image processing step of performing an image processing different from one another on each of the plurality of partial areas in the captured image acquired in the captured image acquiring step according to the subject distance information acquired in the distance information acquiring step.

According to the third aspect of the present invention, there is provided an image processing program for an image processing apparatus that performs an image processing on a captured image. The program makes the image processing apparatus function as; a captured image acquiring section that acquires a captured image taken by an image capturing apparatus; a distance information acquiring section that acquires subject distance information that is information indicative of a distance between the image capturing apparatus and a subject for each of a plurality of partial areas in the captured image acquired by the captured image acquiring section; and an image processing section that performs an image processing different from one another on each of the plurality of partial areas in the captured image acquired by the captured image acquiring section according to the subject distance information acquired by the distance information acquiring section.

According to the fourth aspect of the present invention, there is provided an image capturing apparatus. The apparatus includes: an image capturing section; a focusing distance controlling section that controls a focusing distance of the image capturing section; a preliminary image acquiring section that sequentially acquires a plurality of preliminary images taken by the image capturing section when the focusing distance controlling section sequentially changes the focusing distance; a focusing distance determining section that analyzes the plurality of preliminary images acquired by the preliminary image acquiring section every focusing distance to determine a focusing distance for a main subject; a captured image acquiring section that acquires a captured image taken by the image capturing section when the focusing distance controlling section controls a focusing distance to the focusing distance determined by the focusing distance determining section; and an image outputting section that outputs the plurality of preliminary images acquired by the preliminary image acquiring section every focusing distance along with the captured image acquired by the captured image acquiring section.

According to the fifth aspect of the present invention, there is provided an image capturing method. The method includes: a focusing distance controlling step of controlling a focusing distance of an image capturing section; a preliminary image acquiring step of sequentially acquiring a plurality of preliminary images taken by the image capturing section when the focusing distance is sequentially changed in the focusing distance controlling step; a focusing distance determining step of analyzing the plurality of preliminary images acquired in the preliminary image acquiring step every focusing distance to determine a focusing distance for a main subject; a captured image acquiring step of acquiring a captured image taken by the image capturing section when a focusing distance is controlled to the focusing distance determined in the focusing distance determining step in the focusing distance controlling step; and an image outputting step of outputting the plurality of preliminary images acquired in the preliminary image acquiring step every focusing distance along with the captured image acquired in the captured image acquiring step.

According to the sixth aspect of the present invention, there is provided an image capturing apparatus. The apparatus includes: an image capturing section; a focusing distance controlling section that controls a focusing distance of the image capturing section; a preliminary image acquiring section that sequentially acquires a plurality of preliminary images taken by the image capturing section when the focusing distance controlling section sequentially changes the focusing distance; a focusing distance determining section that analyzes the plurality of preliminary images acquired by the preliminary image acquiring section every focusing distance to determine a focusing distance for a main subject; a captured image acquiring section that acquires a captured image taken by the image capturing section when the focusing distance controlling section controls a focusing distance to the focusing distance determined by the focusing distance determining section; and a subject distance computing section that analyzes the plurality of preliminary images acquired by the preliminary image acquiring section every focusing distance to compute a distance between the image capturing section and a subject for each of a plurality of partial areas in the captured image acquired by the captured image acquiring section.

According to the seventh aspect of the present invention, there is provided an image capturing method. The method includes: a focusing distance controlling step of controlling a focusing distance of an image capturing section; a preliminary image acquiring step of sequentially acquiring a plurality of preliminary images taken by the image capturing section when the focusing distance is sequentially changed in the focusing distance controlling step; a focusing distance determining step of analyzing the plurality of preliminary images acquired in the preliminary image acquiring step every focusing distance to determine a focusing distance for a main subject; a captured image acquiring step of acquiring a captured image taken by the image capturing section when a focusing distance is controlled to the focusing distance determined in the focusing distance determining step in the focusing distance controlling step; and a subject distance computing step of analyzing the plurality of preliminary images acquired in the preliminary image acquiring step every focusing distance to compute a distance between the image capturing section and a subject for each of a plurality of partial areas in the captured image acquired in the captured image acquiring step.

According to the eighth aspect of the present invention, there is provided an image capturing apparatus. The apparatus includes: an image capturing section; a distance measuring section that measures a distance between the image capturing section and a subject for each of a plurality of distance measuring points within an image capturing range of the image capturing section; a measured distance data storing section that respectively stores measured distance data indicative of a plurality of distances measured by the distance measuring section in association with an image taken by the image capturing section and positions of the plurality of distance measuring points in the image taken by the image capturing section; and an image outputting section that outputs the image taken by the image capturing section along with the plurality of measured distance data stored on the measured distance data storing section.

According to the ninth aspect of the present invention, there is provided an image capturing method. The method includes: a distance measuring step of measuring a distance between an image capturing section and a subject for each of a plurality of distance measuring points within an image capturing range of the image capturing section; a measured distance data storing step of respectively storing measured distance data indicative of a plurality of distances measured in the distance measuring step in association with an image taken by the image capturing section and positions of the plurality of distance measuring points in the image taken by the image capturing section; and an image outputting step of outputting the image taken by the image capturing section along with the plurality of measured distance data stored in the measured distance data storing step.

According to the tenth aspect of the present invention, there is provided an image capturing apparatus. The apparatus includes: an image capturing section; a distance measuring section that measures a distance between the image capturing section and a subject for a distance measuring point within an image capturing range of the image capturing section; a focusing distance controlling section that controls a focusing distance of the image capturing section; a preliminary image acquiring section that sequentially acquires a plurality of preliminary images taken by the image capturing section when the focusing distance controlling section sequentially changes the focusing distance within a predetermined range including the distance measured by the distance measuring section; a focusing distance determining section that analyzes the plurality of preliminary images acquired by the preliminary image acquiring section to determine a focusing distance for a main subject; and a captured image acquiring section that acquires a captured image taken by the image capturing section when the focusing distance controlling section controls a focusing distance to the focusing distance determined by the focusing distance determining section. Moreover, the distance measuring section may irradiate infrared light on the image capturing range to measure the distance between the image capturing section and the subject included in the image capturing range.

According to the eleventh aspect of the present invention, there is provided an image capturing method. The method includes: a distance measuring step of measuring a distance between an image capturing section and a subject for a distance measuring point within an image capturing range of the image capturing section; a focusing distance controlling step of controlling a focusing distance of the image capturing section; a preliminary image acquiring step of sequentially acquiring a plurality of preliminary images taken by the image capturing section when the focusing distance is sequentially changed within a predetermined range including the distance measured in the distance measuring step in the focusing distance controlling step; a focusing distance determining step of analyzing the plurality of preliminary images acquired in the preliminary image acquiring step to determine a focusing distance for a main subject; and a captured image acquiring step of acquiring a captured image taken by the image capturing section when a focusing distance is controlled to the focusing distance determined in the focusing distance determining step in the focusing distance controlling step.

The summary of the invention does not necessarily describe all necessary features of the present invention. The present invention may also be a sub-combination of the features described above.

According to the present invention, an image processing can be performed based on a distance computed for each partial area within an image capturing range.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
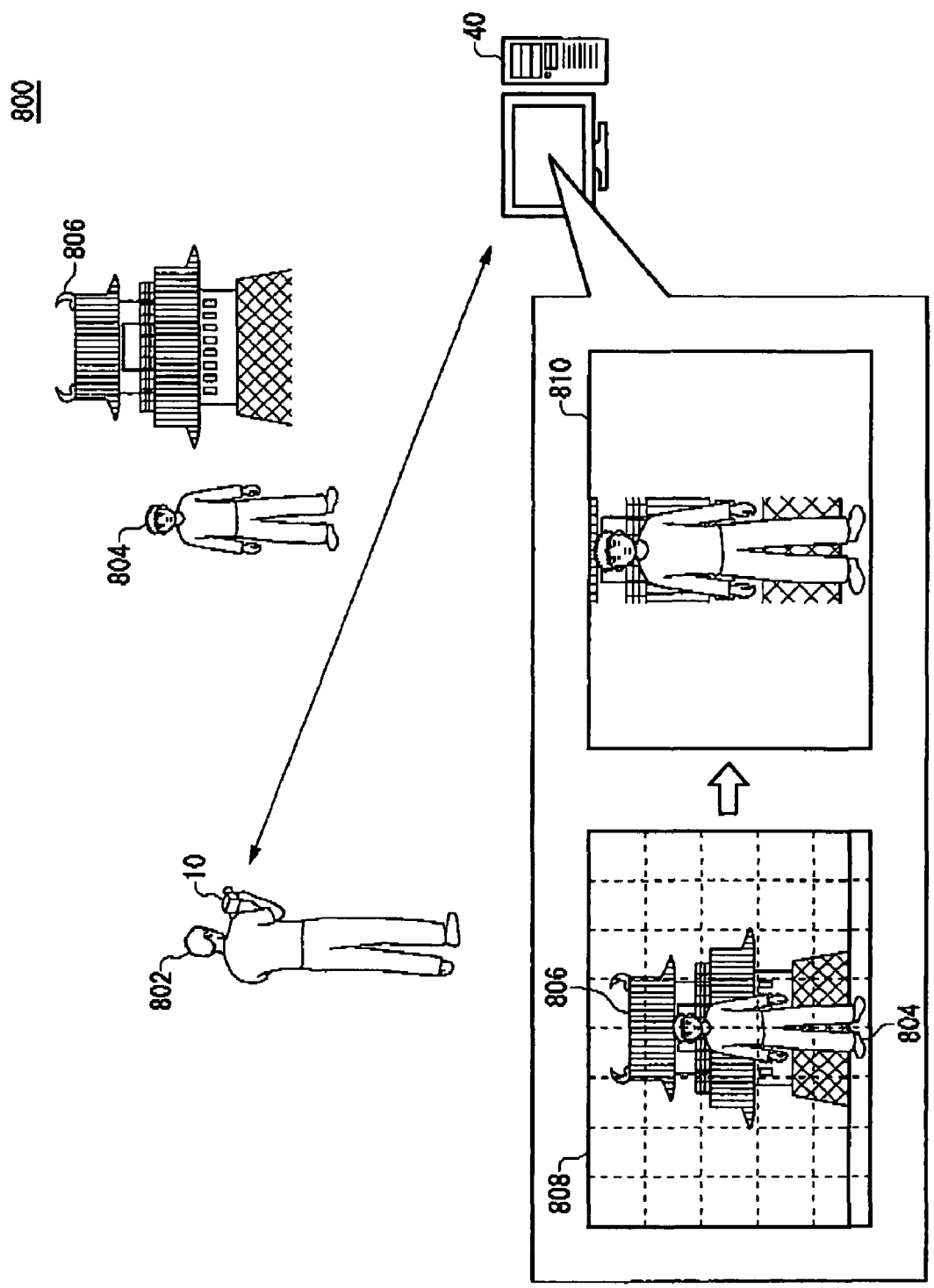
FIG. 1 is a conceptual diagram showing an image processing system.

FIG. 1 is a schematic diagram showing an image processing system 800 according to an embodiment of the present invention. The image processing system 800 includes an image capturing apparatus 10 and an image processing apparatus 40. When a user 802 takes a FIG. 804 and a castle 806, the image capturing apparatus 10 acquires subject distance information between the image capturing apparatus 10 and the FIG. 804 and between the image capturing apparatus 10 and the castle 806. Here, the subject distance information maybe information showing a distance between an image capturing apparatus and a subject for each of partial areas in a captured image. Moreover, the subject distance information may be a focusing distance when a subject is focused by automatic focusing. Furthermore, the subject distance information may be measured distance data showing a distance between an image capturing apparatus and a subject, or maybe a distance between an image capturing apparatus and a subject computed from a three-dimensional image.

Then, the image capturing apparatus 10 performs an image processing for each of partial areas in a captured image 808 based on the subject distance information. For example, the image capturing apparatus 10 trims off the FIG. 804 based on the subject distance information computed for each partial area. Then, the image capturing apparatus 10 outputs an image 810 trimmed. In addition, the image processing apparatus 40 may perform an image processing on the captured image taken by the image capturing apparatus 10. That is, the image processing apparatus 40 may perform a trimming processing on the FIG. 804 to output the trimmed image 810.

An object of the image processing system 800 according to the present embodiment is to perform an image processing on a captured image based on a distance computed for each of partial areas within an image capturing range.

Figure 2:
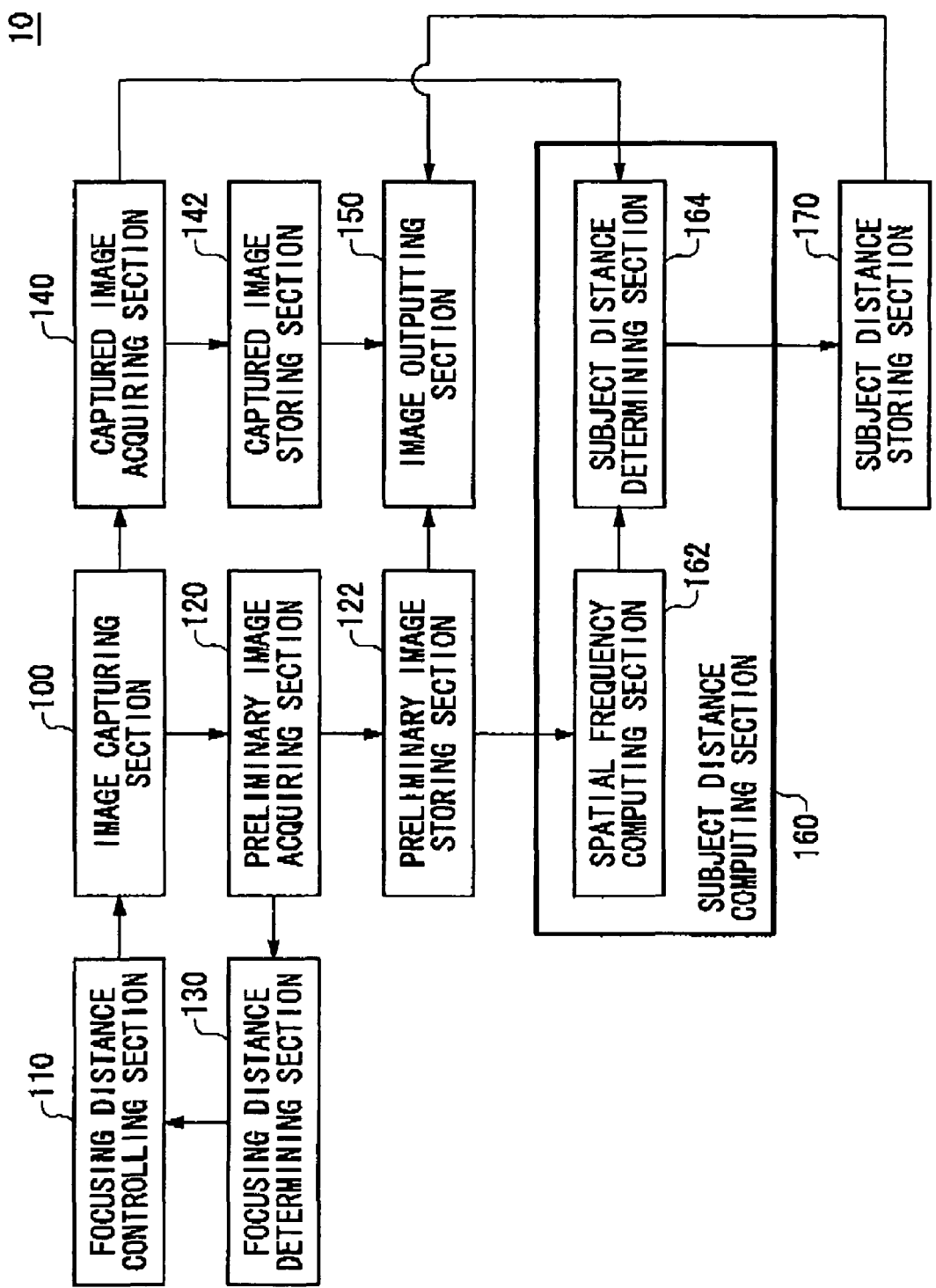
FIG. 2 is a block diagram showing a functional configuration of an image capturing apparatus.

FIG. 2 is a view showing the first example of a functional configuration of the image capturing apparatus 10 according to the present embodiment. The image capturing apparatus 10 includes an image capturing section 100, a focusing distance controlling section 110, a preliminary image acquiring section 120, a preliminary image storing section 122, a focusing distance determining section 130, a captured image acquiring section 140, a captured image storing section 142, an image outputting section 150, a subject distance computing section 160, and a subject distance storing section 170. Moreover, the subject distance computing section 160 has a spatial frequency computing section 162 and a subject distance determining section 164.

The focusing distance controlling section 110 controls a focusing distance of the image capturing section 100. Then, the image capturing section 100 takes a plurality of preliminary images when the focusing distance is sequentially changed. Here, a preliminary image may be an image being acquired in order to determine an image capturing condition such as a focusing position. For example, a preliminary image may be an image with lower resolution than that of a captured image among images taken every focusing position. The image capturing section 100 supplies the captured plurality of preliminary images to the preliminary image acquiring section 120.

The preliminary image acquiring section 120 sequentially acquires the plurality of preliminary images taken by the image capturing section 100. The preliminary image acquiring section 120 supplies the acquired plurality of preliminary images to the preliminary image storing section 122 and the focusing distance determining section 130. The focusing distance determining section 130 analyzes the plurality of preliminary images acquired by the preliminary image acquiring section 120 every focusing distance to determine a focusing distance for a main subject. For example, the focusing distance determining section 130 analyzes each of the preliminary images to compute a spatial frequency component of each preliminary image. Then, when a level of a high frequency component of a preliminary image is higher than a predetermined level, the focusing distance determining section 130 may use a focusing distance at which the preliminary image is taken as a focusing distance for a main subject.

Moreover, the focusing distance determining section 130 can determine a main subject by means of color information of the subject, a special feature of shape of the subject, etc. For example, when a figure is assumed as a main subject, the focusing distance determining section 130 automatically extracts a face area by means of color information of the face and a special feature of shape of the face. Then, the focusing distance determining section 130 can decide whether a main subject is a figure by analyzing a brightness and color distribution of an image for the extracted area. In this way, the focusing distance determining section 130 can determine an appropriate focusing distance regardless of a position at which the main subject is located in the captured image.

The focusing distance determining section 130 supplies the determined focusing distance to the focusing distance controlling section 110. The focusing distance controlling section 110 controls a focusing distance of the image capturing section 100. Then, the image capturing section 100 controls a focusing distance to the focusing distance determined by the focusing distance determining section 130 to take an image. Subsequently, the image capturing section 100 supplies the captured image to the captured image acquiring section 140.

The captured image acquiring section 140 acquires the captured image taken by the image capturing section 100 at the focusing distance determined by the focusing distance determining section 130. Then, the captured image acquiring section 140 supplies the acquired captured image to the captured image storing section 142 and the subject distance determining section 164. The captured image storing section 142 stores the captured image received from the captured image acquiring section 140 in association with an identifier capable of uniquely identifying the captured image. Then, the captured image storing section 142 supplies the captured image to the image outputting section 150.

The preliminary image storing section 122 stores the plurality of preliminary images received from the preliminary image acquiring section 120 in association with an identifier capable of uniquely identifying a preliminary image. The preliminary image storing section 122 supplies the plurality of preliminary images to the image outputting section 150 and the spatial frequency computing section 162. The spatial frequency computing section 162 computes a spatial frequency distribution every partial area for each of the plurality of preliminary images received from the preliminary image storing section 122. The spatial frequency computing section 162 supplies the computed spatial frequency distribution to the subject distance determining section 164.

The subject distance determining section 164 compares the spatial frequency distributions computed from the spatial frequency computing section 162 with respect to the same partial area of the preliminary images different from one another. Then, the subject distance determining section 164 determines a focusing distance corresponding to the preliminary image having the largest level of spatial frequency component for a predetermined partial area as a distance between the image capturing apparatus 10 and a subject in the predetermined partial area. In addition, a distance between the image capturing apparatus 10 and the subject in the predetermined partial area determined by the subject distance determining section 164 is an example of subject distance information. Moreover, the subject distance determining section 164 may acquire the subject distance information received from the captured image acquiring section 140 to determine a distance between the image capturing apparatus 10 and the subject in a predetermined partial area. For example, subject distance information may be measured distance data indicative of a distance between the image capturing apparatus 10 and the subject, which is measured by the image capturing apparatus 10.

The subject distance determining section 164 supplies a plurality of distances between the image capturing apparatus 10 and the subject determined by the subject distance determining section 164 to the subject distance storing section 170. The subject distance storing section 170 stores the received distances between the image capturing apparatus 10 and the subject in association with identifiers capable of being identified uniquely. Then, the subject distance storing section 170 supplies the distances between the image capturing apparatus 10 and the subject to the image outputting section 150.

The image outputting section 150 outputs the plurality of preliminary images received from the preliminary image storing section 122 along with the captured image received from the captured image storing section 142. Moreover, the image outputting section 150 may also output subject distance information indicative of a distance between the image capturing apparatus 10 and the subject determined by the subject distance determining section 164. For example, the image outputting section 150 outputs subject distance information to a memory device or the like as digital data. Moreover, the image outputting section 150 may output subject distance information to the image processing apparatus 40, a monitor, a printer, and so on.

According to the image capturing apparatus 10 of the present embodiment, since a distance between the image capturing section 100 and the subject can be computed and output for each of the plurality of partial areas in the captured image, it is possible to use subject distance information even in an image processing step. In this way, since the depth of the subject in the captured image can be determined based on subject distance information, it is possible to trim off the subject with high precision.

Figure 3:
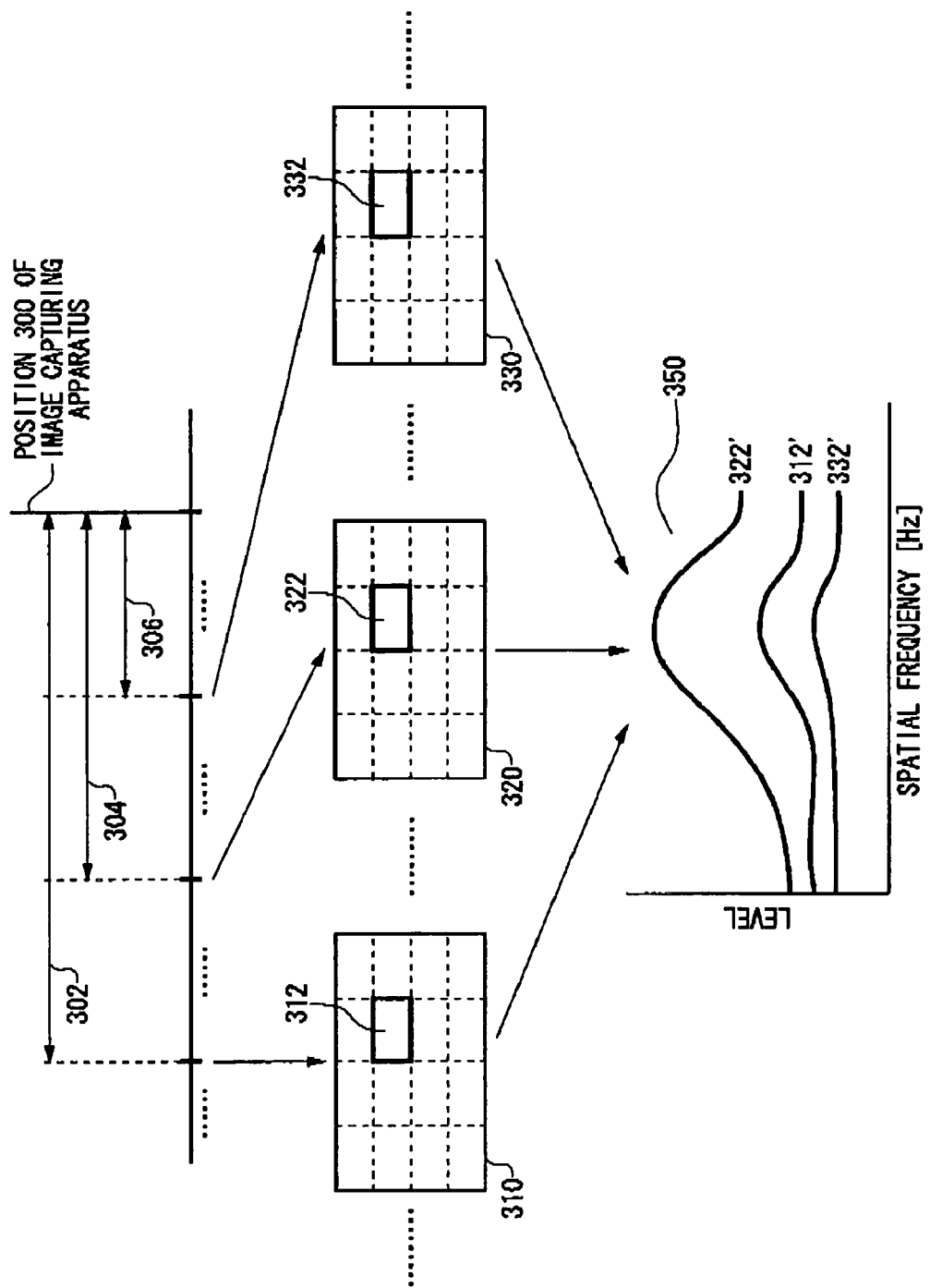
FIG. 3 is a view showing a method for determining a distance between an image capturing apparatus and a subject by a subject distance computing section.

FIG. 3 is a view exemplary showing a method for determining a distance between the image capturing apparatus and the subject by the subject distance computing section 160. The spatial frequency computing section 162 computes a spatial frequency component every partial area of each preliminary image, for each of a plurality of preliminary images 310, 320, and 330 acquired by the preliminary image acquiring section 120 at focusing distances 302, 304, and 306. Then, the subject distance determining section 164 compares spatial frequency distributions computed from the spatial frequency computing section 162 with respect to the same partial area of preliminary images different from one another.

Here, in a graph 350, a horizontal axis shows spatial frequency (Hz) and a vertical axis show a level of spatial frequency in the same partial area of each preliminary image. The subject distance determining section 164 compares levels of spatial frequency computed in the same partial area of each preliminary image. Subsequently, a preliminary image including a partial area having the highest level of spatial frequency is determined. Then, the subject distance determining section 164 determines a focusing distance at which the preliminary image having the highest level of spatial frequency has been taken as subject distance information.

For example, the subject distance determining section 164 respectively compares a spatial frequency of a partial area 312 of the preliminary image 310, a spatial frequency of a partial area 322 of the preliminary image 320, and a spatial frequency of a partial area 332 of the preliminary image 330. In the graph 350, a level of a spatial frequency is high in the order corresponding to a level 322' of spatial frequency of the partial area 322, a level 312' of spatial frequency of the partial area 312, and a level 332' of spatial frequency of the partial area 332.

In this case, the subject distance determining section 164 determines a focusing distance corresponding to the preliminary image 320 including the partial area 322 corresponding to the curved line 322' having the highest level of spatial frequency as a distance between the image capturing apparatus 10 and the subject in the partial area 322. Then, the subject distance determining section 164 determines the focusing distance 304 determined by the subject distance determining section 164 as subject distance information indicative of a distance between the position 300 of the image capturing apparatus and the subject located at the focusing distance 304 in the preliminary image 320.

Figure 4:
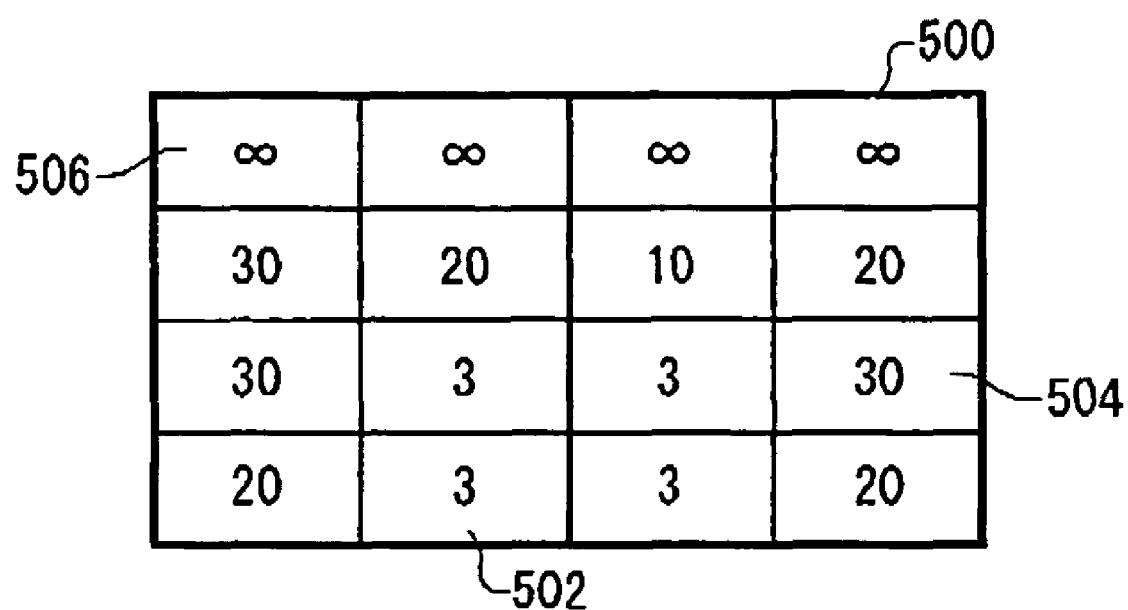
FIG. 4 is a view showing a method for computing a distance between an image capturing apparatus and a subject every partial area by a subject distance computing section.

FIG. 4 is a view exemplary showing a method for computing a distance between the image capturing apparatus and the subject every partial area by the subject distance computing section 160. In the above description in FIG. 3, the subject distance computing section 160 associates subject distance information for each partial area of the preliminary image determined by the subject distance determining section 164 with each partial area of the preliminary image. Then, the subject distance information associated with each partial area by the subject distance computing section 160 is supplied to the subject distance storing section 170. Subsequently, the subject distance storing section 170 stores the received subject distance information in association with a partial area.

For example, when a focusing distance determined by the subject distance determining section 164 is 3 m in a partial area 502 of a preliminary image 500, the subject distance computing section 160 computes that the subject distance information of the partial area 502 is 3 m. Similarly, the subject distance computing section 160 computes that the subject distance information is 30 m in a partial area 504 of the preliminary image 500. Moreover, when the focusing distance determined by the subject distance determining section 164 is larger than a predetermined distance, as shown in a partial area 506, the subject distance computing section 160 may define subject distance information as ∞ (infinite repetition).

Figure 5:
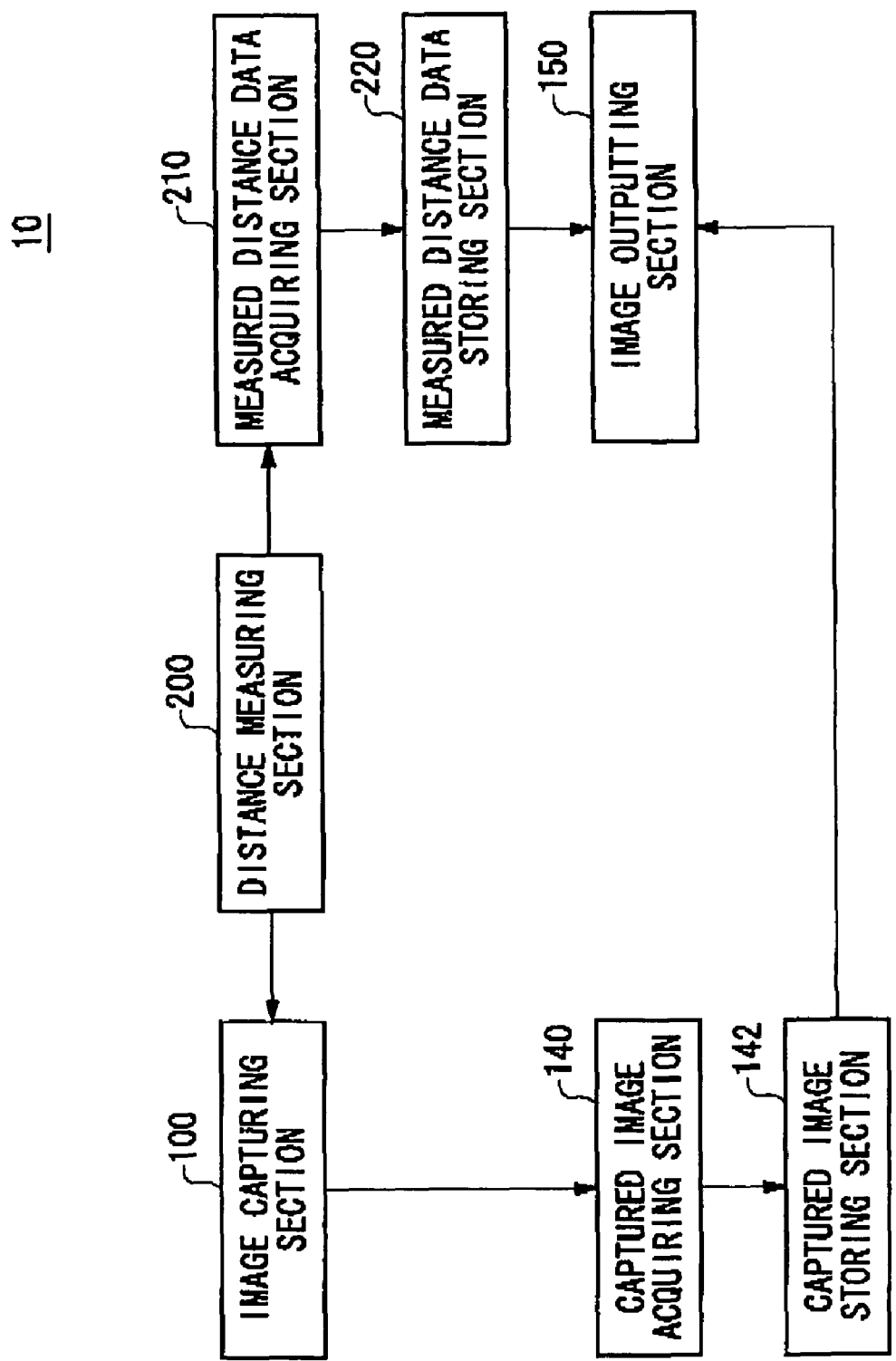
FIG. 5 is a block diagram showing a functional configuration of an image capturing apparatus.

FIG. 5 is a view showing the second example of a functional configuration of an image capturing apparatus 10 according to the present invention. The image capturing apparatus 10 includes an image capturing section 100, a captured image acquiring section 140, a captured image storing section 142, an image outputting section 150, a distance measuring section 200, a measured distance data acquiring section 210, and a measured distance data storing section 220. Here, because the image capturing section 100, the captured image acquiring section 140, the captured image storing section 142, and the image outputting section 150 have the generally same function as that of each component of the same reference numeral described in FIG. 2, their descriptions will be omitted.

The distance measuring section 200 measures a distance between the image capturing section 100 and the subject for each of a plurality of distance measuring points within an image capturing range of the image capturing section 100. For example, the distance measuring section 200 respectively measures distances between the image capturing section 100 and the subject by means of an active method, a passive method, and a phase difference detecting method. Moreover, the distance measuring section 200 may compute spatial frequency every preliminary image to define a focusing distance corresponding to the preliminary image showing that a frequency component thereof is higher than a predetermined level, as a distance between the image capturing section and the subject. The distance measuring section 200 supplies the measured distance data to the measured distance data acquiring section 210.

The measured distance data acquiring section 210 acquires measured distance data indicative of a distance between the image capturing apparatus 10 and the subject measured by the distance measuring section 200 as subject distance information. The measured distance data acquiring section 210 supplies the acquired measured distance data to the measured distance data storing section 220. The measured distance data storing section 220 stores the measured distance data received from the measured distance data acquiring section 210 in association with an image taken by the image capturing section 100 and a plurality of positions of distance measuring points in the image taken by the image capturing section 100. Then, the measured distance data storing section 220 supplies the plurality of measured distance data to the image outputting section 150.

According to the image capturing apparatus 10 of the present embodiment, it is possible to measure and output a distance between the image capturing section 100 and the subject for each of the plurality of distance measuring points in the captured image. In this way, it is possible to conduce to an image processing such as a trimming processing based on subject distance information computed for each distance measuring point of the captured image.

Figure 6:
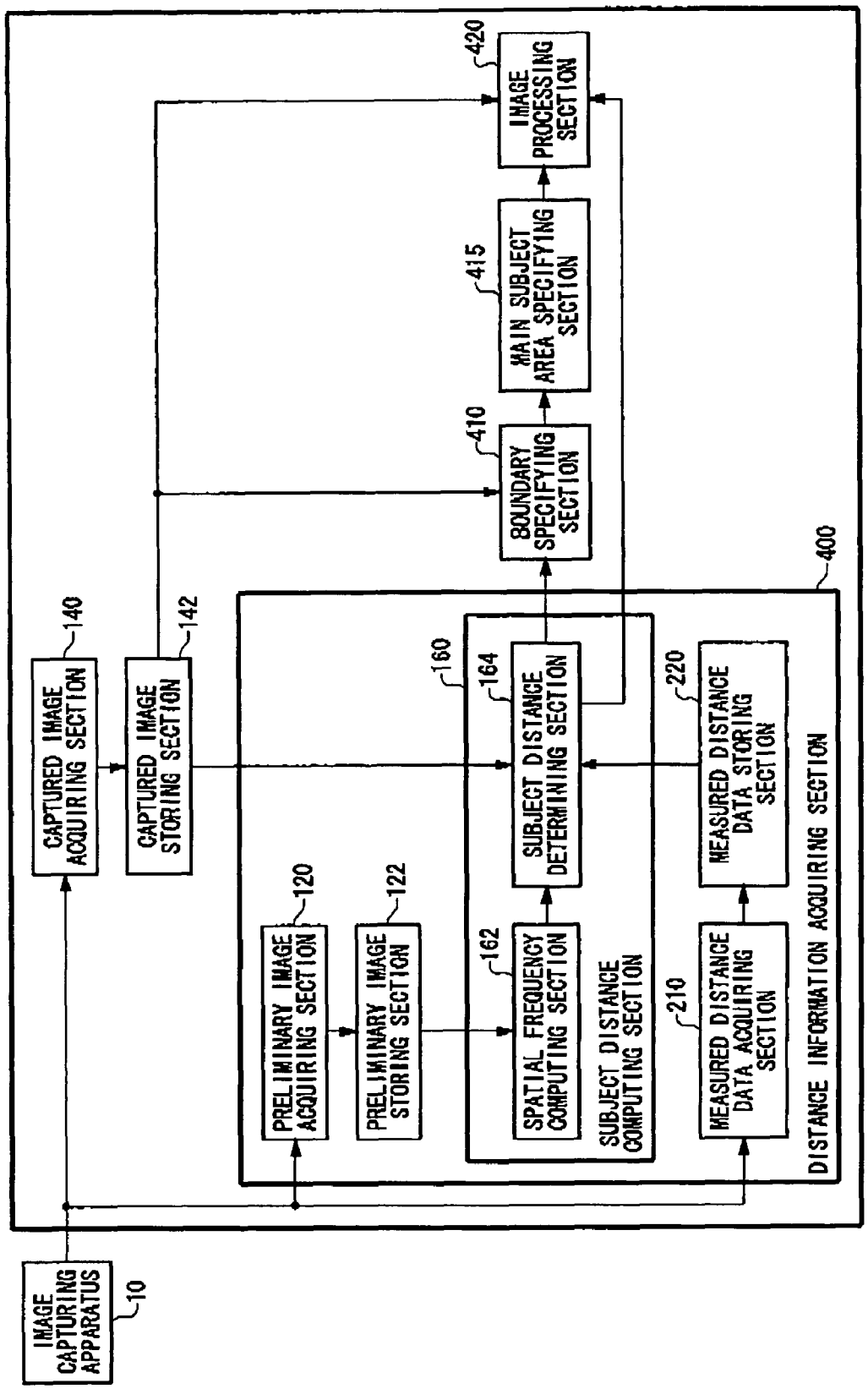
FIG. 6 is a view showing a functional configuration of an image processing apparatus.

FIG. 6 is a view exemplary showing a functional configuration of the image processing apparatus 40. The image processing apparatus 40 includes a captured image acquiring section 140, a captured image storing section 142, a distance information acquiring section 400, a boundary specifying section 410, a main subject area specifying section 415, and an image processing section 420. Further, the distance information acquiring section 400 has a preliminary image acquiring section 120, a preliminary image storing section 122, a subject distance computing section 160, a measured distance data acquiring section 210, and a measured distance data storing section 220. Moreover, the subject distance computing section 160 includes a spatial frequency computing section 162 and a subject distance determining section 164. Here, because the preliminary image acquiring section 120, the preliminary image storing section 122, the captured image acquiring section 140, the captured image storing section 142, the subject distance computing section 160, the spatial frequency computing section 162, the subject distance determining section 164, the measured distance data acquiring section 210, and the measured distance data storing section 220 have the generally same function as that of each component of the same reference numeral described in FIGS. 2 and 3, their descriptions will be omitted.

The boundary specifying section 410 specifies a boundary of an object in the captured image acquired by the captured image acquiring section 140 based on the subject distance information acquired by the distance information acquiring section 400. The boundary specifying section 410 supplies the specified boundary information to the main subject area specifying section 415 and the image processing section 420. The main subject area specifying section 415 specifies a main subject area that is an area of a main subject included in the captured image acquired by the captured image acquiring section 140 by means of the boundary specified by the boundary specifying section 410. In addition, a main subject area is an example of a partial area. Specifically, the main subject area specifying section 415 may specify, as a main subject area, an area of an object occupying the largest area in the captured image among objects shown by the boundary of object specified by the boundary specifying section 410. Moreover, when a position of an object area in the captured image shown by the boundary of object specified by the boundary specifying section 410 is within a predetermined range from a center of the captured image, the main subject area specifying section 415 may specify an area of the object as a main subject area. For example, the main subject area specifying section 415 may specify an area of an object closer to a center of the captured image as a main subject area. Furthermore, the main subject area specifying section 415 may specify, as a main subject area, an area of an object in which a distances from the image capturing apparatus 10 to the subject shown by the subject distance information acquired by the distance information acquiring section 400 is the closest to the image capturing apparatus 10. The main subject area specifying section 415 supplies the specified information related to the area of main subject to the image processing section 420.

The image processing section 420 receives the captured image stored on the captured image storing section 142, the subject distance information determined by the subject distance determining section 164, the boundary information of object specified by the boundary specifying section 410, and the information related to the area of main subject received from the main subject area specifying section 415. The image processing section 420 performs an image processing different from one another for each of a plurality of partial areas in the captured image acquired by the captured image acquiring section 140, based on the subject distance information acquired by the distance information acquiring section 400. For example, an object included in the captured image is trimmed off. Then, a blurring process may be performed on the outside of the boundary of the object included in the captured image. Moreover, the image processing section 420 performs an image processing different from each other on an image in the main subject area and an image in an area except the main subject area, based on the information related to the area of main subject. In addition, the information related to the area of main subject may be information showing the position and magnitude occupied by the area of main subject in the captured image.

Moreover, the image processing section 420 may perform an image processing on the image in the area except the main subject area so as to have a color definition lower than that of the image in the main subject area. Here, a color definition is a degree of shading of a pixel, brightness, chroma saturation, and a contrast. Then, an image processing reducing a color definition is an image processing for reducing the change of shading of a pixel compared to that of a pixel of an original image, an image processing for lowering brightness compared to that of an original image, an image processing for lowering chroma saturation compared to that of an original image, and an image processing for reducing a contrast compared to that of an original image. Moreover, the image processing section 420 may perform an image processing by a gamma correction on the image in the area except the main subject area so as to have a color definition lower than that of the image in the main subject area.

Furthermore, the image processing section 420 may perform an image processing on an image in a partial area farther from the image capturing apparatus 10, as shown by the subject distance information acquired by the distance information acquiring section 400, so as to have a lower color definition. For example, the image processing section 420 performs an image processing on an image in a partial area farther from the image capturing apparatus 10 so as to be blurred more. In this way, since the image processing section 420 can clarify an image in the main subject area close to the image capturing apparatus 10, whereas perform a blurring processing on an image in a partial area corresponding to an area distant from the image capturing apparatus 10 and the main subject, which is a partial area not including the main subject, a user can easily acquire an image emphasizing a main subject.

In addition, the boundary specifying section 410 and the image processing section 420 may be included in the image capturing apparatus 10 described in FIGS. 2 and 3. Then, based on a process of the boundary specifying section 410 and the image processing section 420 included in the image capturing apparatus 10, a boundary of an object in a captured image may be specified or an image processing such as trimming is performed on an object included in a captured image.

According to the image processing apparatus 40 of the present embodiment, it is possible to perform an image processing on a captured image based on the subject distance information computed for each of the plurality of partial areas in the captured image and the distance between the image capturing section and the subject computed for each of the plurality of distance measuring points in the captured image. In this way, an image processing or the like for detecting a boundary of an object can be performed with high precision.

Figure 7:
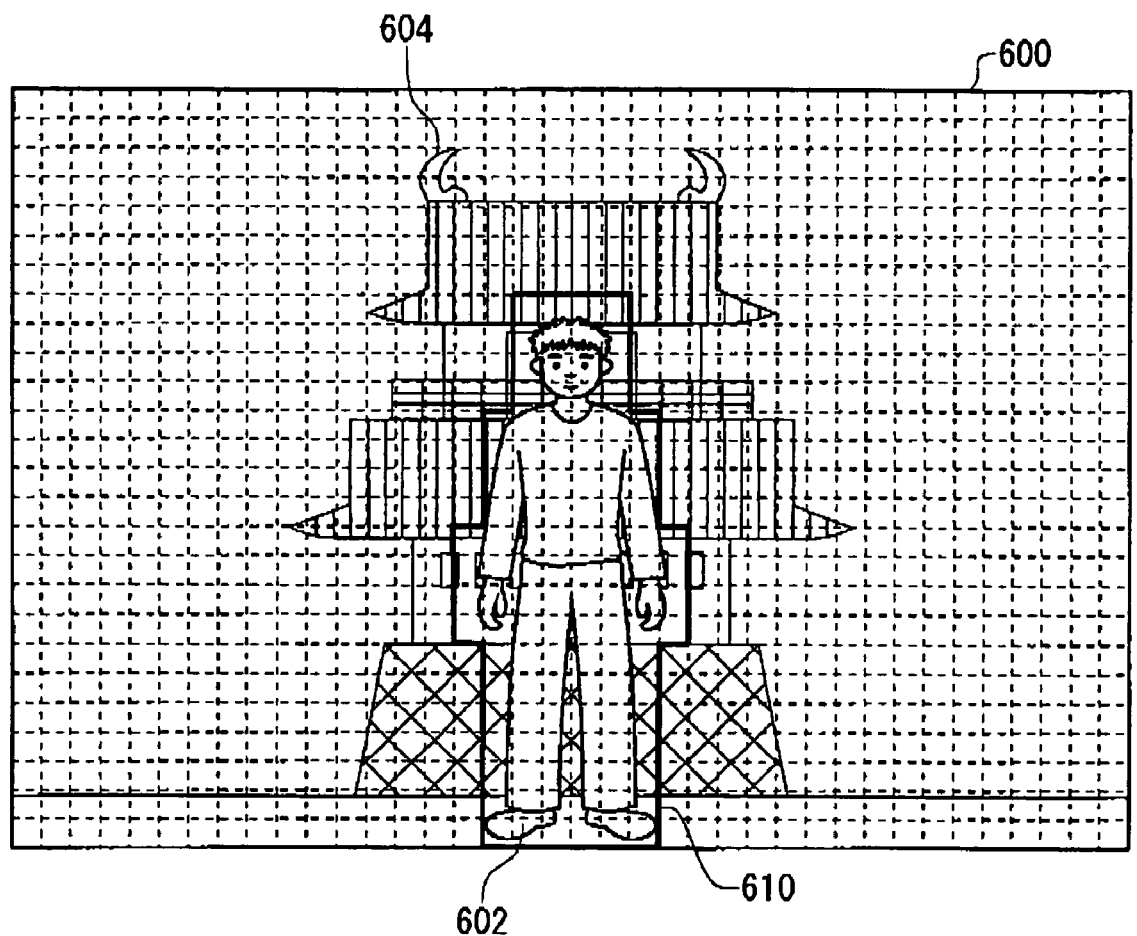
FIG. 7 is a method for trimming an object by a boundary specifying section.

FIG. 7 is a view exemplary showing a method for trimming off an object by the boundary specifying section 410 according to the present embodiment. The boundary specifying section 410 trims off a FIG. 602 based on subject distance information for each of a plurality of partial areas in a captured image acquired by the distance information acquiring section 400. First, the boundary specifying section 410 specifies an object included in a plurality of partial areas associated with the same subject distance information as the same object. Then, the boundary specifying section 410 specifies a plurality of partial areas different from the partial areas in which the same object has been taken as an area in which an object different from the specified object or a background has been taken. In this way, the boundary specifying section 410 can trim off an object with high precision. In addition, the boundary specifying section 410 may trim off an object so as to include a partial area including the object.

For example, it is considered that a distance by subject distance information between the image capturing apparatus 10 and the FIG. 602 for each partial area including the FIG. 602 is 3 m, a distance by subject distance information between the image capturing apparatus 10 and a castle 604 is 50 m, and a distance by subject distance information between the image capturing apparatus 10 and other partial areas is ∞. In this case, the boundary specifying section 410 specifies a portion, for which a distance by subject distance information is 3 m, as an area including the FIG. 602. Then, the image processing section 420 extracts the area including the FIG. 602 as a trimming image 610 based on the area specified by the boundary specifying section 410. In addition, the image processing section 420 may perform a blurring process or an image processing for rendering colors or forms on an area outside the area including the FIG. 602, in addition to trimming off the FIG. 602.

Figure 8:
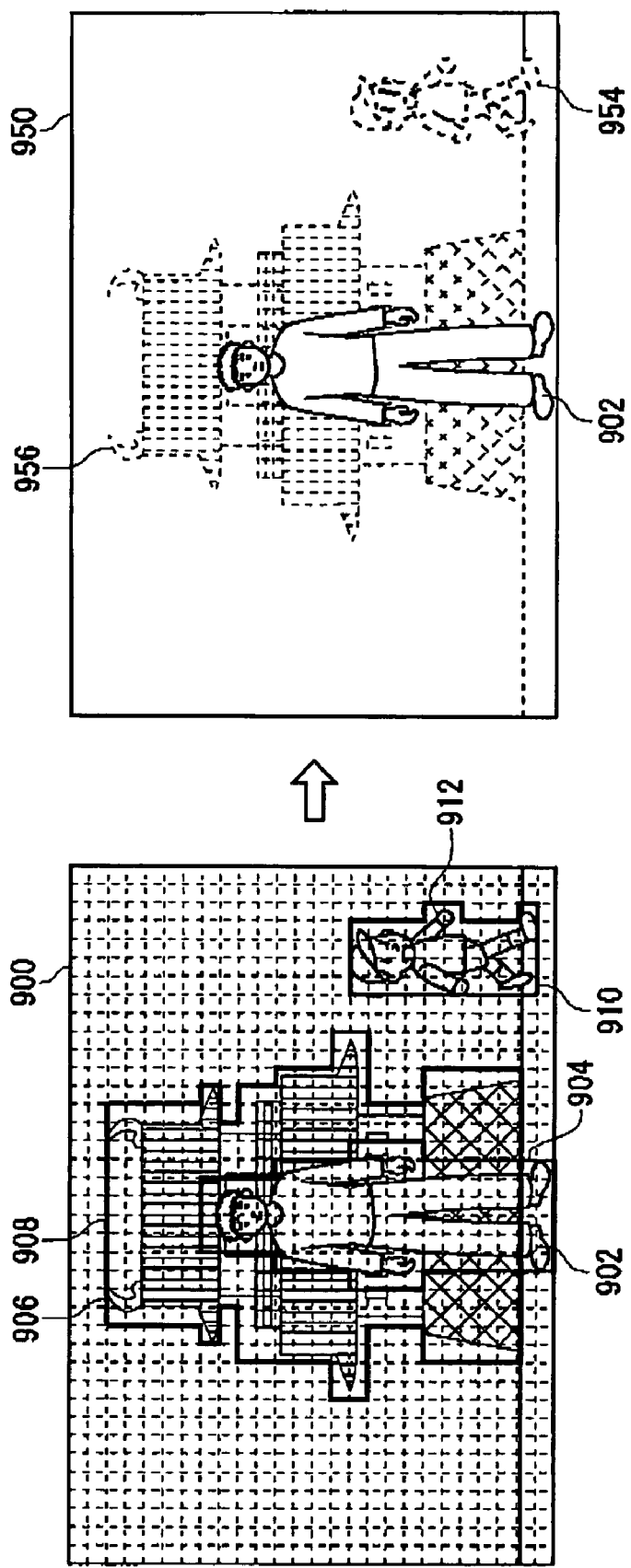
FIG. 8 is a view showing an image processing of an image processing section.

FIG. 8 is a view exemplary showing an image processing of the image processing section 420 according to the present embodiment. First, the boundary specifying section 410 specifies a boundary of a subject in a captured image 900 based on subject distance information showing a distance from the image capturing apparatus 10 to the subject acquired by the distance information acquiring section 400. Specifically, the boundary specifying section 410 specifies areas of a FIG. 902, a castle 906, and a FIG. 912. For example, the boundary specifying section 410 respectively specifies a boundary 904 of the FIG. 902, a boundary 908 of the castle 906, and a boundary 910 of the FIG. 912 based on each distance from the image capturing apparatus 10 to each subject. Subsequently, the main subject area specifying section 415 specifies an area that is surrounded by the boundary 904 including the FIG. 902 of which the distance from the image capturing apparatus 10 is closer than that of other subjects, as a main subject area in the captured image 900.

Then, the image processing section 420 respectively performs an image processing different from each other on the main subject area surrounded in the boundary 904 and the images in the areas except the main subject area. For example, the image processing section 420 may perform a more blurring process on partial areas including subjects farther from the image capturing apparatus 10 than the image in the main subject area. That is, the image processing section 420 may perform a blurring process on the images included in the area 910 and the area 908 to generate a generation image 950. In the generation image 950, the image corresponding to the area of the FIG. 902 is included clearly, whereas the images corresponding to areas of the FIG. 954 and the castle 956 are blurred. In this way, the image processing section 420 can easily generate the generation image 950 in which only the main subject is emphasized.

Moreover, when the distance from the image capturing apparatus 10 to the castle 906 is farther than the distance from the image capturing apparatus 10 to the FIG. 912, the image processing section 420 may perform an image processing different from each other according to a distance from the image capturing apparatus 10 to a subject. Specifically, the image processing section 420 may perform a more blurring process on the image in the area surrounded by the boundary 908 including the castle 906 farther from the image capturing apparatus 10 than the image in the area surrounded by the boundary 910 including the FIG. 912. In addition, an image processing performed on the partial areas by the image processing section 420 may be, for example, a process averaging the change of shading of pixels included in the partial area, a process reducing chroma saturation, and a process reducing a contrast. Moreover, the image processing section 420 may perform an image processing by a gamma correction on the partial area. For example, the image processing section 420 may convex a gamma curve beneath compared to a gamma curve shown by an original image and perform an image processing on the partial area.

Figure 9:
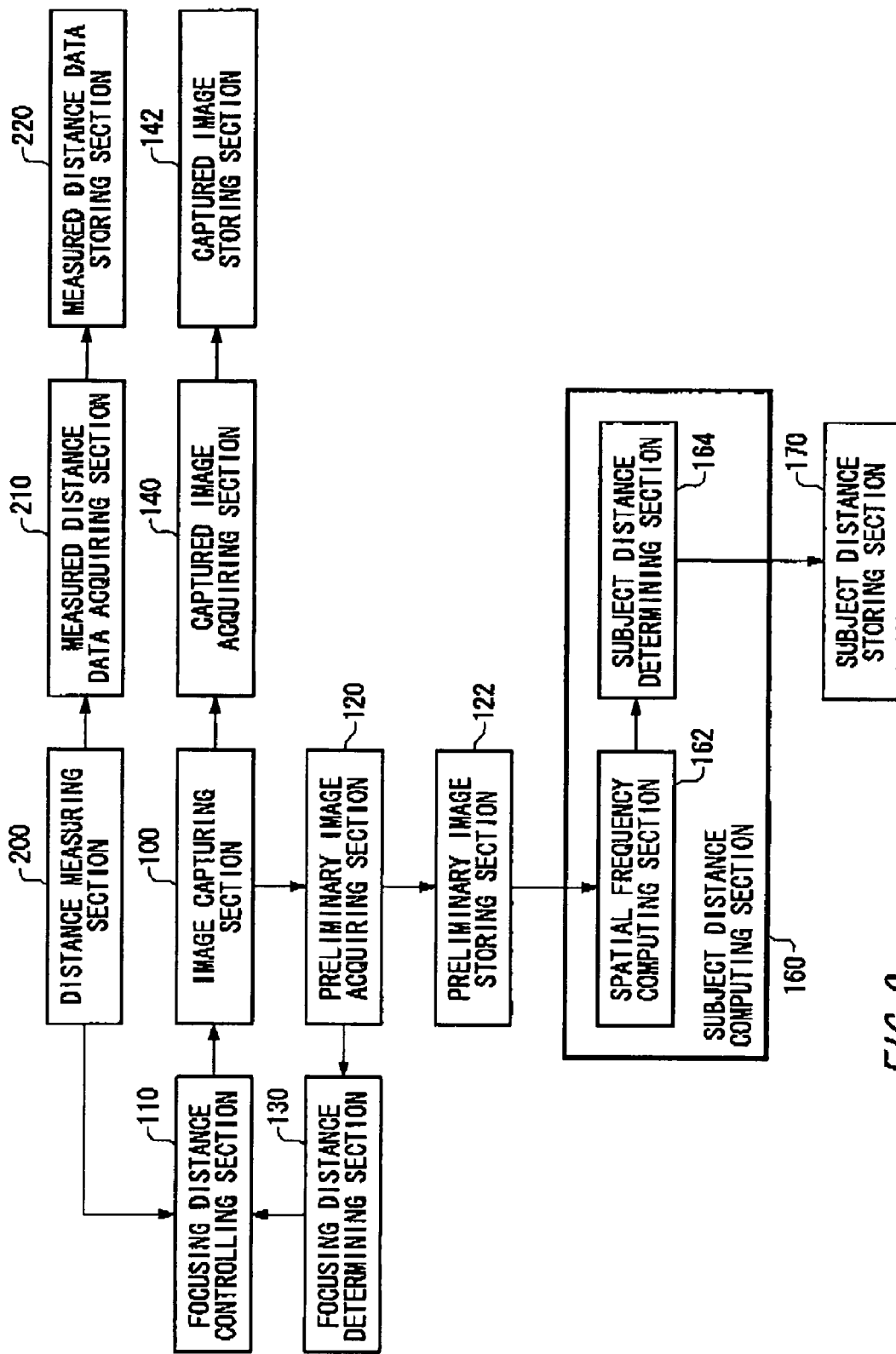
FIG. 9 is a block diagram showing a functional configuration of an image capturing apparatus.

FIG. 9 shows the third example of a functional configuration of an image capturing apparatus 10 according to the present invention. The image capturing apparatus 10 includes an image capturing section 100, a focusing distance controlling section 110, a preliminary image acquiring section 120, a preliminary image storing section 122, a focusing distance determining section 130, a captured image acquiring section 140, a captured image storing section 142, a subject distance computing section 160, a subject distance storing section 170, a distance measuring section 200, a measured distance data acquiring section 210, and a measured distance data storing section 220. Moreover, the subject distance computing section 160 has a spatial frequency computing section 162 and a subject distance determining section 164. Here, since each component of the same reference numerals as those described in FIGS. 2, 3, and 6 has the generally same function as that of each component described in FIGS. 2, 3, and 6, their descriptions will be omitted.

The distance measuring section 200 respectively measures a distance between the image capturing section 100 and the subject for each of a plurality of distance measuring points within an image capturing range of the image capturing section 100. Moreover, the distance measuring section 200 may irradiate infrared light on an image capturing range to measure a distance between the image capturing section 100 and the subject included in the image capturing range. Specifically, the distance measuring section 200 may have an infrared light distance measuring section including an infrared light radiating section for irradiating infrared light on an image capturing range, an infrared light receiving section for receiving infrared light reflected by a subject included in the image capturing range, and a subject distance specifying section for computing a distance between the image capturing section 100 and the subject included in the image capturing range based on the infrared light received by the infrared light receiving section. The distance measuring section 200 supplies the measured distance data to the measured distance data acquiring section 210 and the focusing distance controlling section 110. When the focusing distance controlling section 110 sequentially changes a focusing distance within a predetermined range including the distance measured by the distance measuring section 200, the preliminary image acquiring section 120 sequentially acquires a plurality of preliminary images taken by the image capturing section 100.

The image capturing section 100 acquires the plurality of preliminary images within a predetermined distance range based on the distance measured by the distance measuring section 200. Then, the focusing distance determining section 130 analyzes the plurality of preliminary images acquired by the preliminary image acquiring section 120 to determine a focusing distance for a main subject. For example, the focusing distance determining section 130 computes a spatial frequency component of a partial area in each preliminary image. Then, the focusing distance determining section 130 focuses a focusing distance on a preliminary image including a partial area in which a high frequency component of spatial frequency is higher than a predetermined level.

In addition, the image capturing apparatus 10 may include the boundary specifying section 410 and the image processing section 420 described in FIG. 6. The image capturing apparatus 10 can specify a boundary of an object in a captured image or perform an image processing such as trimming on an object included in a captured image by including the boundary specifying section 410 and the image processing section 420.

According to the image capturing apparatus 10 of the present embodiment, since a preliminary image can be taken within a predetermined range and a focusing distance can be determined from the taken preliminary image based on measured distance data measured by the distance measuring section 200, a focusing distance does not need to be sequentially changed within the whole range of the focusing distance in the image capturing range to acquire a preliminary image and thus a processing level during capturing an image can be reduced.

Figure 10:
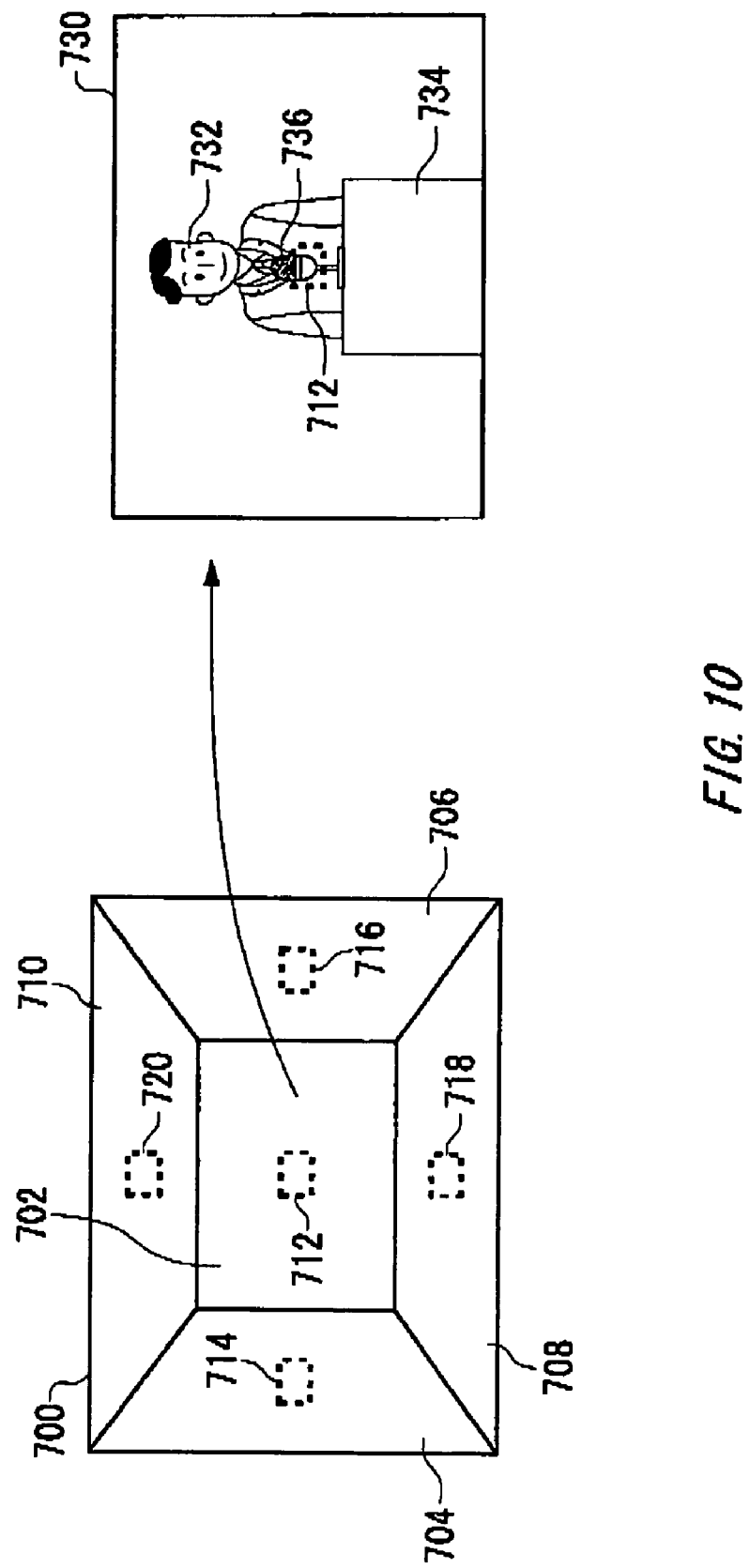
FIG. 10 is a view showing a method for determining a focusing distance by an image capturing apparatus.
Figure 11:
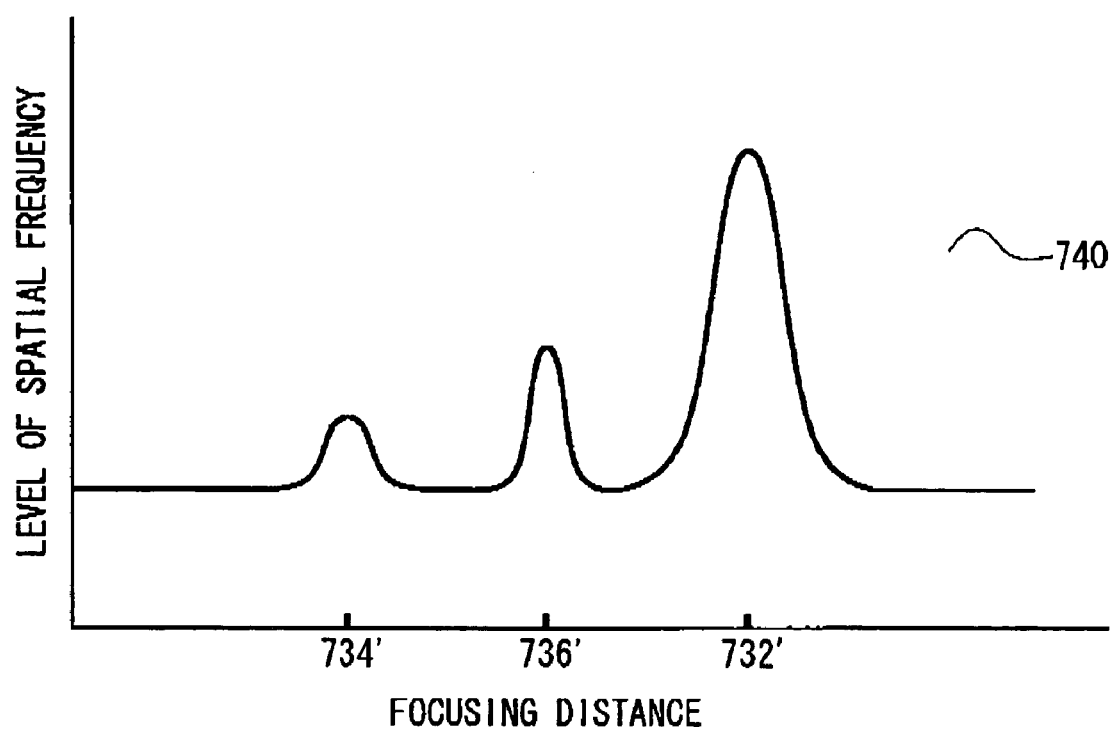
FIG. 11 is a graph showing relation between a focusing distance and spatial frequency when an image capturing apparatus determines a focusing distance.

FIG. 10 is a view exemplary showing a method for determining a focusing distance by the image capturing apparatus 10. FIG. 11 is a graph exemplary showing relation between a focusing distance and spatial frequency when the focusing distance is determined by the image capturing apparatus 10. In a graph 740 shown in FIG. 11, a horizontal axis is a focusing distance and a vertical axis is a level of spatial frequency of an object.

The distance measuring section 200 acquires measured distance data at a plurality of distance measuring points 712 or the like included in a plurality of partial areas 702 or the like within an image capturing range 700 of the image capturing section 100. For example, it is considered that there are taken a FIG. 732 that is a main subject and a lectern 734 and a microphone 736 that are not the main subject at the distance measuring point 712. In this case, the image capturing section 100 takes a plurality of preliminary images at a focusing distance within a predetermined range with a central focus on the distance measured at the distance measuring point 712. That is, the distance measuring section 200 computes a distance measured at each distance measuring point. Subsequently, the focusing distance controlling section 110 sets a focusing distance in a predetermined range with a central focus on the measured distance data computed from the distance measuring section 200. Then, within the range of the focusing distance set by the focusing distance controlling section 110, the image capturing section 100 sequentially takes a plurality of preliminary images.

For example, when the measured distance data computed from the distance measuring section 200 is 1 m, the focusing distance controlling section 110 may set a 50 cm range before or after 1 m as a focusing distance with a central focus on the point where the focusing distance is 1 m. Then, the image capturing section 100 acquires the plurality of preliminary images in the range of the focusing distance set by the focusing distance controlling section 110. Moreover, when the measured distance data computed from the distance measuring section 200 is 10 m, the focusing distance controlling section 110 may set a 1 m range before or after 10 m as a focusing distance with a central focus on the point where a focusing distance is 10 m. Then, the image capturing section 100 acquires the plurality of preliminary images in the range of the focusing distance set by the focusing distance controlling section 110. Furthermore, when the measured distance data computed from the distance measuring section 200 is 30 m, the focusing distance controlling section 110 sets a 4 m range before or after 30 m as a focusing distance with a central focus on the point where the focusing distance is 30 m, and the image capturing section 100 acquires the plurality of preliminary images in the range of the set focusing distance.

In this manner, as measured distance data becomes more distant, the image capturing section 100 may take a plurality of preliminary images at a wider focusing distance. Then, the subject distance determining section 164 computes spatial frequency every partial area from the plurality of preliminary images taken by the image capturing section 100. Then, the subject distance determining section 164 determines a focusing distance having the largest level of spatial frequency as a focusing distance between the image capturing apparatus 10 and an object. For example, as shown in the graph 740 in FIG. 11, when the focusing distance computed based on the measured distance data is matched to the microphone 736, the spatial frequency computing section 162 computes a level 732', a level 734', and a level 736' of spatial frequency corresponding to the FIG. 732, the lectern 734, and the microphone 736 in the preliminary image 730. Then, the focusing distance 732' corresponding to the FIG. 732 having the largest level of spatial frequency is determined as a focusing distance between the image capturing apparatus 10 and the FIG. 732 in the preliminary image 730.

According to the image capturing apparatus 10 of the present embodiment, it is possible to measure a distance between the image capturing apparatus 10 and an object to determine a focusing distance within a predetermined range as the basis for the measured distance data. In this way, although the focusing distance determined based on the measured distance data does not meet a main subject, the focusing distance can accurately be matched to the main subject. Moreover, it is possible to reduce a processing level to determine a focusing distance.

Figure 12:
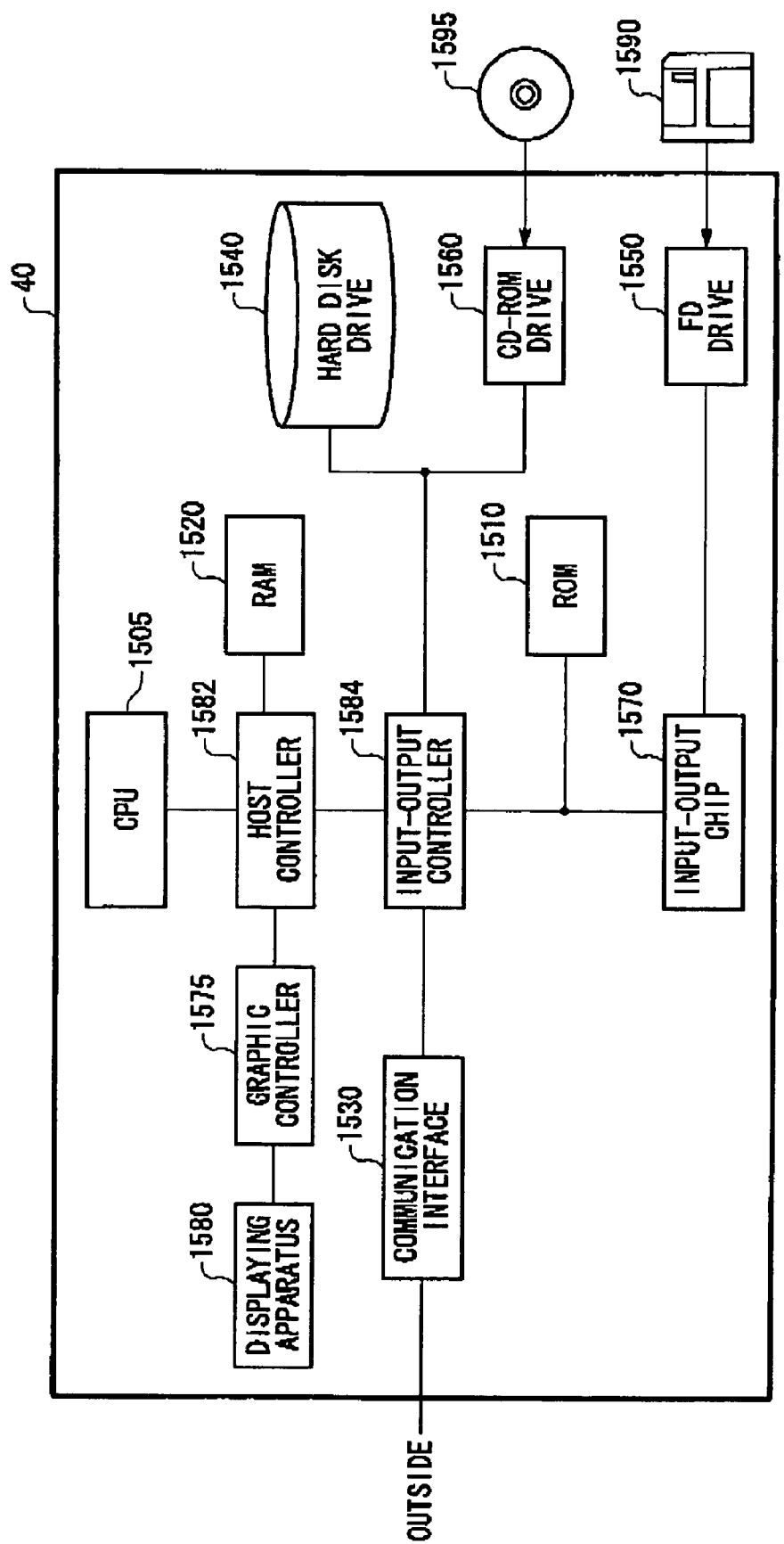
FIG. 12 is a block diagram showing a hardware configuration of an image processing apparatus.

FIG. 12 is a view exemplary showing a hardware configuration of the image processing apparatus 40 according to the present embodiment. The image processing apparatus 40 includes a CPU peripheral section having a CPU 1505, a RAM 1520, a graphic controller 1575, and a displaying apparatus 1580 that are connected to one another by a host controller 1582, an input-output section having a communication interface 1530, a hard disk drive 1540, and a CD-ROM drive 1560 that are connected to the host controller 1582 by an input-output controller 1584, and a legacy input-output section having a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the displaying apparatus 1580. Alternatively, the graphic controller 1575 may include therein the frame buffer storing the image data generated from the CPU 1505.

The input-output controller 1584 connects the host controller 1582 to the communication interface 1530, the hard disk drive 1540, and the CD-ROM drive 1560 that are a comparatively fast input-output apparatus. The communication interface 1530 communicates with another apparatus via a network. The hard disk drive 1540 stores a program and data to be used by the CPU 1505 in the image processing apparatus 40. The CD-ROM drive 1560 reads a program or data from a CD-ROM 1595, and provides the program or data to the hard disk drive 1540 via the RAM 1520.

The ROM 1510, the flexible disk drive 1550, and the input-output chip 1570 that are a comparatively low-speed input-output apparatus are connected to the input-output controller 1584. The ROM 1510 stores a boot program to be executed during starting the image processing apparatus 40, a program dependent on hardware of the image processing apparatus 40, or the like. The flexible disk drive 1550 reads a program or data from a flexible disk 1590, and provides the program or data to the hard disk drive 1540 via the RAM 1520. The input-output chip 1570 connects various kinds of input-output apparatuses such as the flexible disk drive 1550 via a parallel port, a serial port, a keyboard port, a mouse port, or the like.

An image processing program provided to the hard disk drive 1540 via the RAM 1520 is stored on a recording medium such as the flexible disk 1590, the CD-ROM 1595, or an IC card in order to be provided by a user. The image processing program is read from the recording medium, is installed in the hard disk drive 1540 in the image processing apparatus 40 via the RAM 1520, and is executed in the CPU 1505. The image processing program installed and executed in the image processing apparatus 40 works on the CPU 1505 or the like and makes the image processing apparatus 40 function as the preliminary image acquiring section 120, the preliminary image storing section 122, the captured image acquiring section 140, the captured image storing section 142, the subject distance computing section 160, the spatial frequency computing section 162, the subject distance determining section 164, the measured distance data acquiring section 210, the measured distance data storing section 220, the distance information acquiring section 400, the boundary specifying section 410, the main subject area specifying section 415, and the image processing section 420, which have been described with reference to FIGS. 6 to 8.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image processing system comprising:
a captured image acquiring section that acquires a captured image taken by an image capturing apparatus;
a distance information acquiring section that acquires subject distance information that is information indicative of a distance between the image capturing apparatus and a subject for each of a plurality of partial areas in the captured image acquired by said captured image acquiring section;
an image processing section that performs an image processing different from one another on each of the plurality of partial areas in the captured image acquired by said captured image acquiring section according to the subject distance information acquired by said distance information acquiring section;
a boundary specifying section that specifies a boundary of a subject in the captured image acquired by said captured image acquiring section based on the subject distance information acquired by said distance information acquiring section, wherein said image processing section uses the boundary specified by said boundary specifying section to perform an image processing on the captured image acquired by said captured image acquiring section; and
a main subject area specifying section that specifies a main subject area that is an area of a main subject included in the captured image acquired by said captured image acquiring section by means of the boundary specified by said boundary specifying section, wherein
said image processing section performs an image processing different from each other on an image in the main subject area and an image in an area except the main subject area,
said image processing section performs an image processing on the image in the area except the main subject area so as to have a color definition lower than that of the image in the main subject area, and
said image processing section generates a new image in which only the main subject is emphasized by processing a captured image.

2. The image processing system as claimed in claim 1, wherein said image processing section uses the boundary specified by said boundary specifying section to trim off the captured image acquired by said captured image acquiring section.

3. The image processing system as claimed in claim 1, wherein said image processing section performs an image processing by a gamma correction on the image in the area except the main subject area so as to have a color definition lower than that of the image in the main subject area.

4. The image processing system as claimed in claim 1, wherein said image processing section performs an image processing on an image in the partial area farther from the image capturing apparatus using the subject distance information acquired by said distance information acquiring section so as to have a lower color definition.

5. The image processing system as claimed in claim 1, wherein said distance information acquiring section comprises:
a preliminary image acquiring section that acquires a plurality of preliminary images taken by an image capturing section every focusing distance when a focusing distance controlling section included in the image capturing apparatus sequentially changes a focusing distance of the image capturing section; and
a subject distance computing section that analyzes the plurality of preliminary images acquired by the preliminary image acquiring section every focusing distance to compute a distance between the image capturing apparatus and the subject for each of the plurality of partial areas in the captured image acquired by said captured image acquiring section.

6. The image processing system as claimed in claim 5, wherein the subject distance computing section comprises:
- a spatial frequency computing section that computes a spatial frequency distribution every partial area for each of the plurality of preliminary images acquired by the preliminary image acquiring section every focusing distance; and
- a subject distance determining section that compares the spatial frequency distributions computed from the spatial frequency computing section in regard to the same partial area of the preliminary images different from one another and determines a focusing distance of the preliminary image having the largest level of spatial frequency component in a predetermined partial area as a distance between the image capturing apparatus and the subject in the predetermined partial area.

7. The image processing system as claimed in claim 1, wherein said distance information acquiring section has a measured distance data acquiring section that acquires measured distance data indicative of a distance between the image capturing apparatus and the subject measured by a distance measuring section included in the image capturing apparatus as the subject distance information.

8. An image processing method comprising:
- a captured image acquiring step of acquiring a captured image taken by an image capturing apparatus;
- a distance information acquiring step of acquiring subject distance information that is information indicative of a distance between the image capturing apparatus and a subject for each of a plurality of partial areas in the captured image acquired in said captured image acquiring step;
- an image processing step of performing an image processing different from one another on each of the plurality of partial areas in the captured image acquired in said captured image acquiring step according to the subject distance information acquired in said distance information acquiring step;
- a boundary specifying step of specifying a boundary of a subject in the captured image acquired in said captured image acquiring step based on the subject distance information acquired in said distance information acquiring step, wherein said image processing step uses the boundary specified in said boundary specifying step to perform an image processing on the captured image acquired in said captured image acquiring step; and
- a main subject area specifying step of specifying a main subject area that is an area of a main subject included in the captured image acquired in said captured image acquiring step by means of the boundary specified in said boundary specifying step, wherein
- said image processing step performs an image processing different from each other on an image in the main subject area and an image in an area except the main subject area, respectively,
- said image processing step performs an image processing on the image in the area except the main subject area so as to have a color definition lower than that of the image in the main subject area, and
- said image processing step generates a new image in which only the main subject is emphasized by processing a captured image.

9. A non-transitory computer readable medium storing an image processing program for an image processing apparatus that performs an image processing on a captured image, the program when executed by a processor making the image processing apparatus function as:
- a captured image acquiring section that acquires a captured image taken by an image capturing apparatus;
- a distance information acquiring section that acquires subject distance information that is information indicative of a distance between the image capturing apparatus and a subject for each of a plurality of partial areas in the captured image acquired by said captured image acquiring section;
- an image processing section that performs an image processing different from one another on each of the plurality of partial areas in the captured image acquired by said captured image acquiring section according to the subject distance information acquired by said distance information acquiring section;
- a boundary specifying section that specifies a boundary of a subject in the captured image acquired by said captured image acquiring section based on the subject distance information acquired by said distance information acquiring section, wherein said image processing section uses the boundary specified by said boundary specifying section to perform an image processing on the captured image acquired by said captured image acquiring section; and
- a main subject area specifying section that specifies a main subject area that is an area of a main subject included in the captured image acquired by said captured image acquiring section by means of the boundary specified by said boundary specifying section, wherein
- said image processing section performs an image processing different from each other on an image in the main subject area and an image in an area except the main subject area,
- said image processing section performs an image processing on the image in the area except the main subject area so as to have a color definition lower than that of the image in the main subject area, and
- said image processing section generates a new image in which only the main subject is emphasized by processing a captured image.

* * * * *